INVENTOR
RANDALL C. RAGAN
by: Wolfe, Hubbard, Voit & Osann
ATTYS.

INVENTOR
RANDALL C. RAGAN by: Wolfe, Hubbard, Voit & Osann
ATTYS.

United States Patent Office 3,277,232
Patented Oct. 4, 1966

3,277,232

LEAD CONSTRUCTION FOR MINIATURE ELECTRICAL CIRCUIT ELEMENTS

Randall C. Ragan, Tarzana, Calif., assignor to Electra Manufacturing Company, Independence, Kans., a corporation of Missouri Filed Feb. 21, 1964, Ser. No. 346,429
4 Claims. (Cl. 174—68.5)

This application is a continuation-in-part of my copending application Serial No. 173,414, filed Feb. 15, 1962, now abandoned.

This invention relates generally to miniature electrical circuit elements having a circuit material, usually in the form of a thin film, deposited on the surface of an electrically insulating substrate. More particularly, this invention relates to an improved lead construction for such circuit elements which effectively prevents separation of the leads from the circuit material.

In the manufacture of miniature, subminiature, and microminiature circuit elements, the circuit material is generally deposited as a thin film on the surface of an electrically insulating substrate. For the purpose of making electrical connections to the circuit material, two or more leads are attached to the circuit element in electrical contact with the desired points of the circuit material. However, because of the small size of these circuit elements the area of attachment for the leads to the circuit material is also small and, therefore, the mechanical strength of the resulting connection is low. As a result, it is rather easy for the leads to become separated from the circuit element during handling and use thereof. This can be appreciated from the fact that the size of a typical microminiature resistor, for example, is 0.125 inch long by 0.050 inch wide with leads having a diameter of 0.007 inch. Consequently, even with careful and delicate handling of these circuit elements, lead separation is still a problem.

Another problem encountered with the miniature film type circuit elements is heat removal. Although the circuit material is quite small, the substrate on which the circuit material is deposited is generally a very poor conductor of heat, and so heat tends to build up within the substrate during extended periods of operation. Thus, the temperature rating, as well as the power rating, of these devices is not as high as it might be with a more efficient system of heat removal.

It is a primary object of the present invention to provide an improved lead construction for miniature film-type circuit elements whereby the leads cannot be readily separated from the circuit element. Thus, it is a related object to provide such a construction which causes any forces applied to the free ends of the leads to be transmitted to the substrate of the circuit element rather than to the electrical connections between the leads and the circuit material. Another related object is to provide a rugged lead construction which permits the circuit element to be handled by its leads without causing lead separation.

It is another object of this invention to provide an improved lead construction for miniature film-type circuit elements which assists in the removal of heat from the insulating substrates of the elements. More particularly, it is an object to provide a heat sink within the substrate directly beneath at least a portion of the circuit material on the surface of the substrate. In this connection, it is an object to provide such a construction which increases both the temperature rating and the power rating of the circuit element.

It is a further object of this invention to provide an improved lead construction for miniature film-type circuit elements which improves the reliability of the elements as compared with constructions used heretofore. Still another object is to provide such a lead construction which is simple and economical to manufacture.

In one particular aspect of the invention, it is an object to provide an improved lead construction which does not have to be oriented and which takes up very little space. An allied object of this aspect of the invention is to provide such a construction in which the lead has improved anti-pullout characteristics and improved contact with the metallized portion of the substrate. A still further object is to provide such a construction in which the lead can be soldered to the circuit element by the application of heat alone.

Other objects and advantages of the invention will become apparent upon reading the following description and appended claims and upon reference to the drawings, in which:

Figures 1, 2, 3:
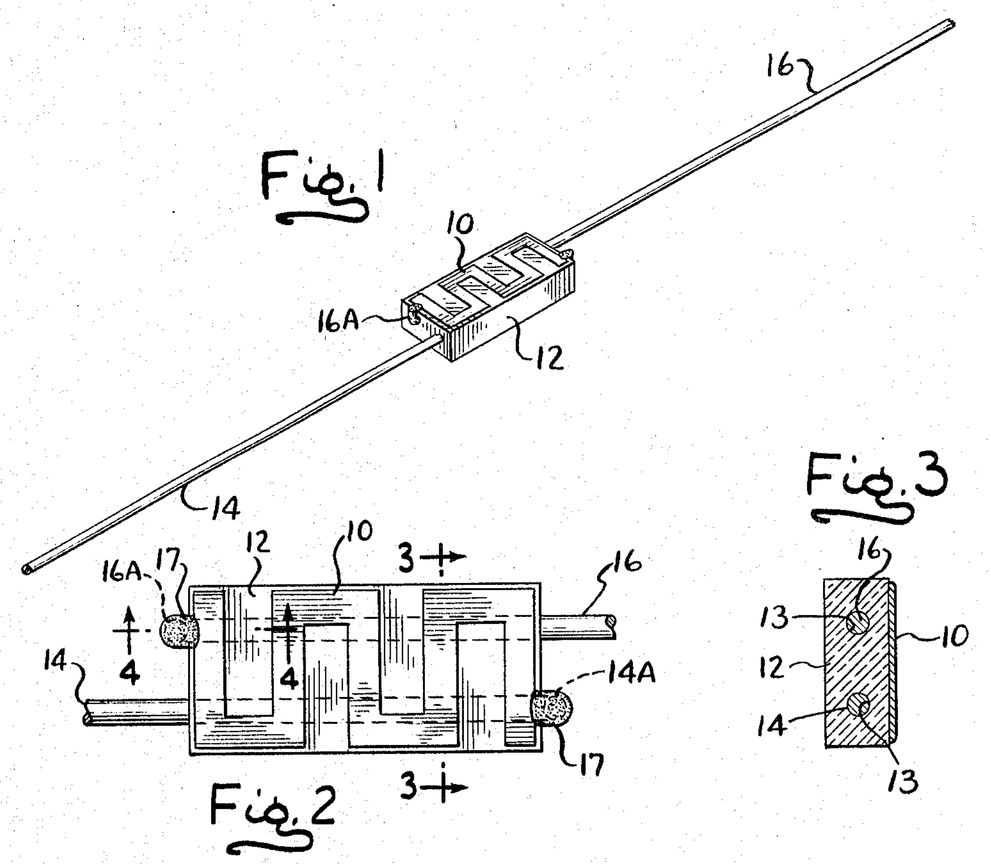
FIGURE 1 is a perspective view of a microminiature film-type resistor embodying the present invention.
FIG. 2 is an enlarged plan view of the resistor of FIG. 1.
FIG. 3 is a cross-sectional view taken along line 3—3 in FIG. 2.

While the invention will be described in connection with certain preferred embodiments, it will be understood that there is no intention to limit the invention to the embodiments shown, but, on the contrary, it is intended to cover the various modifications and alternatives included within the spirit and scope of the appended claims.

Turning now to the drawings, there is shown a microminiature electrical resistor including an electrically conductive film 10 deposited on an electrically insulating substrate 12. Although the invention will be described hereinafter with particular reference to film-type resistors, it will be appreciated that the invention is equally applicable to any other miniaturized circuit element having the desired circuit material deposited on the surface of an electrically insulating substrate, such as printed capacitors for example. The film 10 may be printed on the upper surface of the substrate 12 by any of the well-known printing processes, such as silk screening, vacuum evaporation, electro-deposition, cathode sputtering, the application of ordinary printing, engraving, and lithographing techniques and the like.

The substrate 12 may be made of any suitable electrically insulating material such as, for example, porcelain, glass, steatite, fosterite, and other ceramic materials having the necessary chemical, electrical, and physical properties. The substrate must, of course, be capable of withstanding the action of any chemicals used in the film deposition process and the changes in temperaturre encountered both during the manufacturing process and during use of the final product. It will be understood that the term "substrate" as used herein is a general term referring to any desired shape or configuration.

In the practice of the present invention, the substrate is provided with at least one opening extending through the substrate from one end to the other beneath the circuit material in a direction generally parallel to the surface on which the circuit material is deposited, and an electrically conductive lead is provided extending through the opening and having a lateral projection at one end thereof in electrical connection with the circuit material on the surface of the substrate, the lateral projection being in mechanical engagement with the end of the substrate so that any pulling force applied to the other end of the lead is exerted against the substrate rather than the electrical connection between the lead and the circuit material. Thus, in the particular embodiment illustrated in FIGS. 1–4, the substrate 12 is provided with a pair of holes 13 extending through the substrate from one end to the other in a direction parallel to the resistive film 10. These holes 13 may be formed by drilling or may be included in the substrate when it is initially formed into the desired configuration, such as during extrusion of the substrate for example.

For the purpose of making electrical connection with the film 10, a pair of electrically conductive leads 14 and 16 extend through the holes 13, the leads being provided with lateral projections 14A and 16A which extend upwardly over the ends of the substrate into electrical contact with the film 10. In the particular embodiment shown in the drawings, the lateral projections 14A and 16A are formed by bending the end of each lead 14 and 16, respectively, at a right angle to the main body portion of the lead within the hole 13. The end of each projection is then electrically connected to the film 10 by means of a small overlay 17 of silver paste or other suitable electrically conductive material.

In accordance with one aspect of the invention, the lateral projections 14A and 16A are in mechanical engagement with the ends of the substrate so that any pulling force applied to the free ends of the leads is transmitted through the lateral projections to the ends of the substrate rather than to the electrical connections between the projections and the film 10. Thus, even though the area of attachment between the leads 14, 16 and the film 10 is still very small, the resulting construction is mechanically strong and extremely rugged. Indeed, it has been found that the finished circuit element can actually be handled by its leads without causing lead separation. Consequently, there is practically no chance of lead separation during subsequent manipulation and use of the circuit element and, therefore, the overall reliability of the element is considerably improved.

Figure 4:
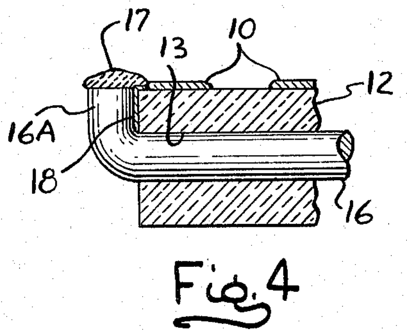
FIG. 4 is an enlarged fragmentary sectional view taken along line 4—4 in FIG. 2.

As illustrated in FIG. 4, it is preferred to metallize those portions of the substrate ends to be engaged by the lateral projections 14A and 16A with thin coatings 18 of electrically conductive metal which extends continuously from the opening 13 to the surface on which the film 10 is deposited. These coatings 18 may be formed by depositing a metallizing liquid onto the desired area and then treating the deposited liquid to form a solid metal film bonded to the substrate. For example, a "silver paint" such as #7095 made by Electrochemicals Division of E. I. du Pont de Nemours and Company is a suitable metallizing liquid. In the case of some metallizing liquids, such as the thermally decomposable metal resinates and abietates, it is necessary to heat the deposited liquid to decompose the metal compound and to drive off certain solvents and binders included therein.

In order to firmly secure the projections 14A and 16A to the substrate ends, the projections may be placed in tight engagement with the coatings 18 and then heated sufficiently to fuse the coatings 18. This bonds the projections 14A and 16A to the substrate ends via the coatings 18 and insures that the projections remain permanently in the desired positions. The coatings 18 also insure good electrical connection between the leads 14, 16 and the film 10. Alternatively, the projections 14A and 16A may be spot welded, or the projections may simply be given a sufficiently tight mechanical crimping to provide satisfactory engagement with the substrate ends.

In accordance with another feature of the invention, the openings 13 and the leads 14 and 16 contained therein are positioned beneath the resistive film 10 on the surface of the substrate so as to assist in the removal of heat accumulating in the substrate 12, which is normally a poor heat conductor. In other words, the leads 14 and 16 are positioned to provide effective heat sinks within the substrate for the heat generated by the resistive film 10 on the surface of the substrate. This increases not only the temperature rating but also the power rating of the film resistor. In order to remove heat uniformly from all portions of the substrate, it is preferred to have the conductive leads extend through the entire length of the substrate.

Figure 5:
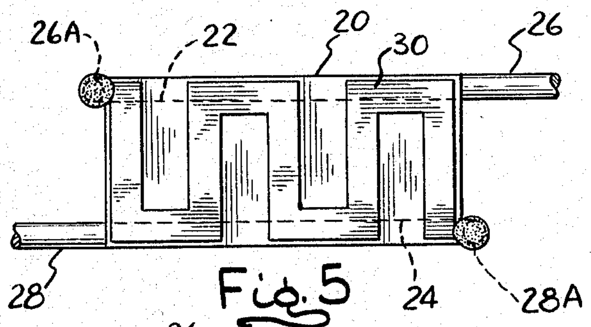
FIG. 5 is a plan view of a microminiature film-type resistor including a modified embodiment of the invention.
Figure 6:
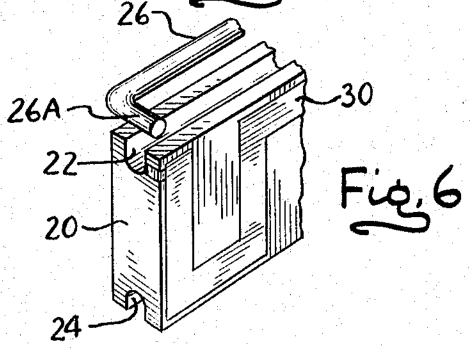
FIG. 6 is a fragmentary perspective view of the resistor of FIG. 5 with the leads removed, one of the leads being shown in position ready for assembly.

It will be appreciated that the leads which extend through the substrate need not be completely contained within the substrate. Thus, in the modified embodiment of FIGS. 5 and 6, a substrate 20 is provided with a pair of side grooves 22 and 24 adapted to receive a pair of electrically conductive leads 26 and 28, respectively. The ends of the leads 26 and 28 are bent at right angles to form lateral projections 26A and 28A which extend upwardly in mechanical engagement with the substrate ends, and are electrically connected to a film 30 on the surface of the substrate in the same manner as described above for the projections 14A and 16A. To insure that the leads 26 and 28 remain firmly in place in the grooves 22 and 24, the grooves may be made slightly undersized to require a force fitting of the leads therein, or the grooves may be coated with cement to bond the leads to the walls of grooves. It will be evident that the grooves may be formed in the bottom rather than the sides of the substrate if desired.

In still another aspect of the invention, the lateral projections on the ends of the leads are provided by flat heads which take up very little space and do not require orientation of the leads. This construction also provides improved anti-pullout characteristics and improved contact with the metallized portions of the substrate ends. Thus, in the embodiment illustrated in FIGS. 7 and 8, each lead 41 and 42 is provided with a flat head 43 which fits firmly against a metallized area 44 formed around the lead opening on the substrate end. The radius of the head 43 is sufficient to extend from the lead 41 or 42 to the substrate surface, where the head is electrically connected to the film 10 by means of the electrically conductive overlay 47.

Figure 7:
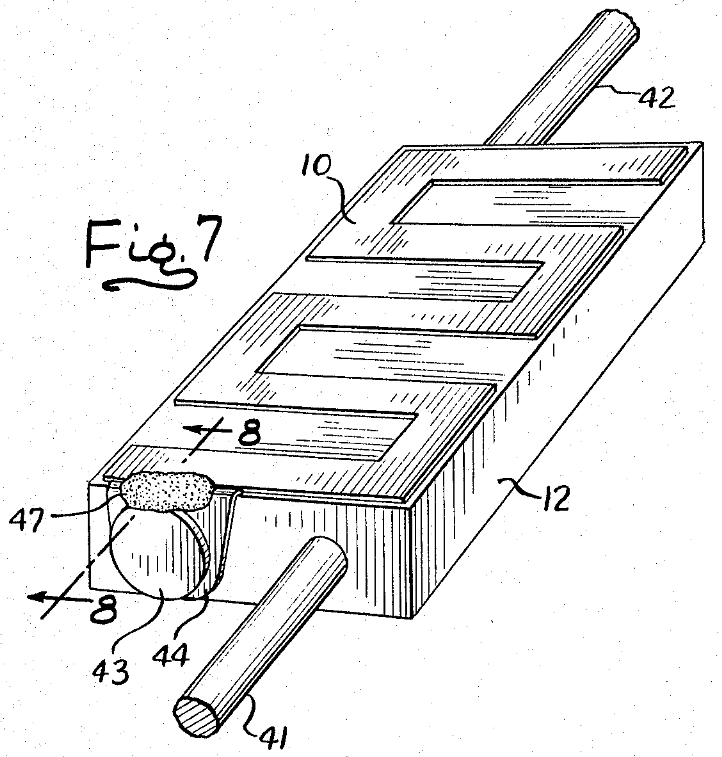
FIG. 7 is a perspective view of a microminiature film-type resistor including another modified embodiment of the invention.
Figure 8:
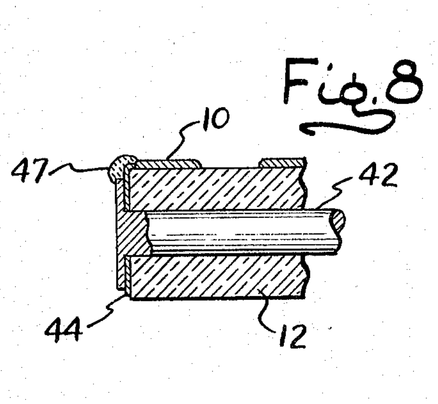
FIG. 8 is an enlarged fragmentary sectional view taken along line 8—8 in FIG. 7.

Since the flat head 43 engages a much larger area of the substrate than the bent ends 14A and 16A of FIG. 1, for example, any pulling forces applied to the free ends of the leads 41 and 42 are exerted on a larger area of the substrate. Consequently, the stress at any given point in the substrate of FIGS. 7 and 8 is relatively small, thereby reducing even further the likelihood of damage to the circuit element. Similarly, the larger area of engagement between the head 43 and the metallized area 44 provides better physical and electrical lead contact. Furthermore, as can be seen from a comparison of FIGS. 4 and 7, the flat head construction avoids the need for lead orientation and takes up considerably less space than the bent lead construction.

It will be apparent that the flat head 43 may be made in a variety of different sizes and shapes, depending on the requirements for the particular circuit element involved. In general, it is preferred that the flat head 43 have an axial thickness less than the diameter of the lead 41 or 42. The head 43 may be formed as an integral part of the main lead 41 or 42, or may be formed separately and then welded to the main lead.

While various specific forms of the present invention have been illustrated and described herein in some detail, it will be understood that the same are susceptible of numerous modifications within the spirit and scope of the invention. For example, although the invention has been described with particular reference to circuit elements having two leads, both of which are provided with the subject lateral projections, the invention may be embodied in only one of the leads or, on the other hand, may be embodied in more than two leads in a single element. Also, where two or more leads are used, the electrical connections between the leads and the circuit material may all be made at the same end of the substrate, rather than at opposite ends as illustrated herein. Moreover, the substrate openings and the leads therein need not always follow a regular, linear path; in some cases, an irregular or curvilear path may be used to improve the heat removal capacity and/or the anti-pullout characteristics of the novel lead construction.

What is claimed is:

1. A miniature electrical circuit element having an improved lead construction, said circuit element comprising the combination of an electrically insulating substrate having a film of circuit material deposited on a surface thereof, said substrate having an opening extending therethrough from one end to the other beneath said circuit material in a direction generally parallel to the surface on which said circuit material is deposited, a metallized coating deposited on the end of said substrate and extending from said opening to said surface on which said circuit material is deposited, an electrically conductive lead extending through said opening and having a lateral projection at one end thereof in electrical connection with said circuit material, said lateral projection being bonded to the end of said substrate via said metallized coating whereby any pulling force applied to the other end of said lead is transmitted through said lateral projection to the end of said substrate rather than the electrical connection between said projection and said circuit material.

2. A miniature electrical circuit element having an improved lead construction, said circuit element comprising the combination of an electrically insulating substrate having a circuit material deposited on a surface thereof, a first electrically conductive lead extending through said substrate in a direction generally parallel to the surface on which said circuit material is deposited and having a lateral projection on one end thereof in electrical connection with said circuit material and in mechanical engagement with the adjacent end of said substrate, a second electrically conductive lead extending through said substrate in a direction generally parallel to the surface on which said circuit material is deposited and having a lateral projection on one end thereof in electrical connection with said circuit material and in mechanical engagement with the adjacent end of said substrate, whereby any pulling force applied to the free ends of said leads is exerted on the ends of said substrate rather than the electrical connections between said lateral projections and said circuit material.

3. A miniature electrical circuit element having an improved lead construction, said circuit element comprising the combination of an electrically insulating substrate having a film of circuit material deposited on a surface thereof, said substrate having a pair of openings extending therethrough from one end to the other beneath said circuit material in a direction generally parallel to the surface on which said circuit material is deposited, a first electrically conductive lead extending through one of said openings and having a head at one end thereof in electrical connection with one end of said circuit material, a second electrically conductive lead extending through the other of said openings and having a head at one end thereof in electrical connection with the opposite end of said circuit material, the heads of said first and second leads being butted firmly against the opposite ends of said substrate so that any pulling force applied to the free ends of said leads is exerted against the ends of said substrate rather than the electrical connections between said heads and said circuit material.

4. A miniature electrical circuit element having an improved lead construction, said circuit element comprising the combination of an electrically insulating substrate having a film of circuit material deposited on a surface thereof, said substrate having a pair of openings extending therethrough from one end to the other in a direction generally parallel to the surface on which said circuit material is deposited, a metallized coating deposited on each end of said susbtrate around one of said openings, said coating extending to the surface on which said circuit material is deposited, a first electrically conductive lead extending through one of said openings and having a flat head at one end thereof in electrical connection with one end of said circuit material, a second electrically conductive lead extending through the other of said openings and having a flat head at one end thereof in electrical connection with the opposite end of said circuit material, the flat heads of said leads being bonded firmly to the opposite ends of said substrate via said metallized coatings whereby any pulling force applied to the free ends of said leads is transmitted to the ends of said substrate rather than the electrical connections between said heads and said circuit material.

No references cited.

LEWIS H. MYERS, *Primary Examiner.*

DARRELL L. CLAY, *Examiner.*